(12) United States Patent
Sachdev et al.

(10) Patent No.: US 7,657,455 B2
(45) Date of Patent: Feb. 2, 2010

(54) METHOD AND SYSTEM FOR ANALYZING A PLURALITY OF PARTS

(75) Inventors: Sunit K. Sachdev, Peoria, IL (US); Nelson A. Jones, Peoria, IL (US); Syamala Srinivasan, Peoria, IL (US)

(73) Assignee: Akoya, Inc., Rosemont, IL (US)

( * ) Notice: Subject to any disclaimer, the term of this patent is extended or adjusted under 35 U.S.C. 154(b) by 1350 days.

(21) Appl. No.: 10/328,071

(22) Filed: Dec. 23, 2002

(65) Prior Publication Data

US 2004/0122860 A1    Jun. 24, 2004

(51) Int. Cl.
*G06F 17/60* (2006.01)
(52) U.S. Cl. .................................................. 705/10
(58) Field of Classification Search .............. 705/7, 705/8, 10
See application file for complete search history.

(56) References Cited

U.S. PATENT DOCUMENTS

| | | | |
|---|---|---|---|
| 4,992,940 A * | 2/1991 | Dworkin ........................ | 705/26 |
| 5,249,120 A | 9/1993 | Foley | |
| 5,526,257 A * | 6/1996 | Lerner ........................... | 705/10 |
| 5,740,425 A * | 4/1998 | Povilus ......................... | 707/100 |
| 6,484,182 B1 * | 11/2002 | Dunphy et al. ................ | 707/3 |
| 6,775,647 B1 | 8/2004 | Evans et al. | |
| 6,922,656 B2 * | 7/2005 | Butler et al. .................. | 702/183 |
| 7,165,036 B2 * | 1/2007 | Kruk et al. .................... | 705/1 |
| 7,231,374 B1 * | 6/2007 | Balasinski .................... | 705/400 |
| 7,251,540 B2 * | 7/2007 | Clarke et al. ................. | 700/108 |
| 2002/0023060 A1 | 2/2002 | Cooney et al. | |
| 2002/0091536 A1 | 7/2002 | Seaman et al. | |
| 2002/0143653 A1 | 10/2002 | DiLena et al. | |
| 2002/0156757 A1 | 10/2002 | Brown | |
| 2002/0174000 A1 | 11/2002 | Katz et al. | |
| 2002/0178027 A1 | 11/2002 | Kawano et al. | |
| 2003/0037014 A1 | 2/2003 | Shimizu et al. | |
| 2003/0055753 A1 | 3/2003 | Dellar et al. | |
| 2003/0128687 A1 | 7/2003 | Worfolk et al. | |
| 2003/0167263 A1 | 9/2003 | Sasaki et al. | |
| 2003/0187870 A1 | 10/2003 | Nakajima et al. | |
| 2003/0191612 A1 | 10/2003 | Chang | |
| 2003/0221172 A1 | 11/2003 | Brathwaite et al. | |

(Continued)

FOREIGN PATENT DOCUMENTS

JP    2002-99591 A    5/2002

(Continued)

OTHER PUBLICATIONS

"Cost Calculation With A Feature Based CAD System Using Modules For Calculation Comparison and Forecast," Journal of Engineering Design, vol. 10, No. 1/Mar. 1, 1999.

(Continued)

*Primary Examiner*—Romain Jeanty
(74) *Attorney, Agent, or Firm*—Reed Smith, LLP (57) ABSTRACT

The present invention includes a method and system configured to analyze a plurality of parts, each of the parts having at least one part characteristic. The method includes the steps of establishing at least one repository of the part characteristics, establishing a relationship between at least a portion of the parts and a cost characteristic; and, analyzing the portion of the parts in response to the relationship.

32 Claims, 5 Drawing Sheets

U.S. PATENT DOCUMENTS

| | | |
|---|---|---|
| 2004/0019538 A1 | 1/2004 | Ballas et al. |
| 2004/0038537 A1 | 2/2004 | Liu et al. |
| 2004/0122860 A1 | 6/2004 | Srinivasan |
| 2004/0138772 A1 | 7/2004 | Barman et al. |
| 2004/0177002 A1 | 9/2004 | Abelow |
| 2005/0080502 A1 | 4/2005 | Chernyak et al. |
| 2005/0097133 A1 | 5/2005 | Pham et al. |
| 2005/0273401 A1 | 12/2005 | Yeh et al. |

FOREIGN PATENT DOCUMENTS

| | | |
|---|---|---|
| WO | WO0210999 A1 | 2/2002 |

OTHER PUBLICATIONS

"Managing Supply Chain Risk With Vykor EPM™ Target Sourcing" Vykor On-Deman Engineered Parts Management Booklet pp. 1-4.

Facts At A Glance About aPriori, pp. 1-2.

"'Should Be' Cost Standards Increasing Savings Without Re-Sourcing" Ariba® pp. 1-7.

"Category Sourcing A Proven Spend Reduction Solution" A.T. Kearney Procurement Solutions, 2 pages.

List of 5 websites for aPriori; Boothroyd-Dewhurst; MTI Systems; Vykor; AT Kearney.

www.R-Project.ORG.

"Statistical Models in S," John M. Chambers and Trevor J. Hastie (1992), Wadsworth & Brooks/Cole Cole Computer Science Series, Pacific Grove, CA, Book.

\* cited by examiner

| PART NO. | PART DESCRIPTION | WEIGHT (kg) | MODEL | DEMAND | PRICE ($) | SUPPLIER |
|---|---|---|---|---|---|---|
| 39Z81 | ROD | 2.3 | XBZ | 87,000 | 14.71 | COMP X |
| 4N56C | ROD CONNECTOR | 3.4 | ZR1 | 34,100 | 92.00 | COMP Y |
| BR549A | ROD | 1.5 | 45A | 19,200 | 10.71 | COMP X |

METHOD AND SYSTEM FOR ANALYZING A PLURALITY OF PARTS

TECHNICAL FIELD

This invention relates generally to a method and system configured to analyze a plurality of parts, and more particularly, to a method and system configured to establish a relationship between at least a portion of the parts and a cost characteristic.

BACKGROUND

Many companies operate in an extremely cost conscious environment. In many cases product markets will not support an increase in the price of the products, despite the pressures from economic factors such as inflation, to raise the prices. Therefore companies are looking within to determine how to reduce the cost of manufacturing the products. A company may increase their profit associated with a product by reducing the cost of manufacturing the product, as opposed to raising the price of the product. One such cost reduction process has been to manually review the parts, or components, that are used to manufacture the product, and manually make associations of the parts with cost. For example, a process of manually establishing a projected cost of a part based on physically identifiable features (e.g., the number of holes in a part) was used. That is, based on past experience it may have been determined that it took one minute to cut a hole in a part. Based on the current labor rate, and the number of holes, the cost of the holes in the part being reviewed could be estimated. Other features such as this were added together to project the cost of a part. This form of part review may be performed for some parts. However, when the number of parts is large, the process clearly becomes overwhelming. In addition, the reliability of manual review is suspect because it is dependent on reviewing physically identifiable features, and often misses underlying interactions that may impact cost.

The present invention is directed to overcoming one or more of the problems set forth above.

SUMMARY OF THE INVENTION

In one aspect of the present invention, a computer based method of analyzing a plurality of parts, each of the parts having at least one part characteristic is disclosed. The method includes the steps of establishing at least one repository of the part characteristics, establishing a relationship between at least a portion of the parts and a cost characteristic, and analyzing the portion of the parts in response to the relationship.

DETAILED DESCRIPTION

The present disclosure includes a system and method of analyzing a plurality of parts, each of the parts having at least one part characteristic. A part may be a product, an assembly, a component of an assembly or a standalone component. Non-limiting examples of parts may include an engine and/or the parts associated with an engine, such as a connecting rod, a transmission, a piston, a cylinder seal, flange, fly wheel, hub, manifold, pulley, etc. However, as indicated, parts may include anything that may be manufactured, assembled, or created. Part characteristics may include the part number, the type of material the part is made of, the type of finish of the part, the production (volume) of a part, the production of a part during a time period, the sales of a part, the sales of a part during a time period, the cost of a part, the cost of part during a time period, the weight of a part, the number of holes in a part, the supplier of a part, the type or category of a part, the profit associated with a part, the profit associated with a part over a time period, etc. Part characteristics may also include logistic and/or economic characteristics. Logistic characteristics may include the transportation cost, transportation time, packaging cost, packaging type, storage cost etc, associated with a part. Economic characteristics may include characteristics such as labor cost, material cost, material source etc.

Figure 1:
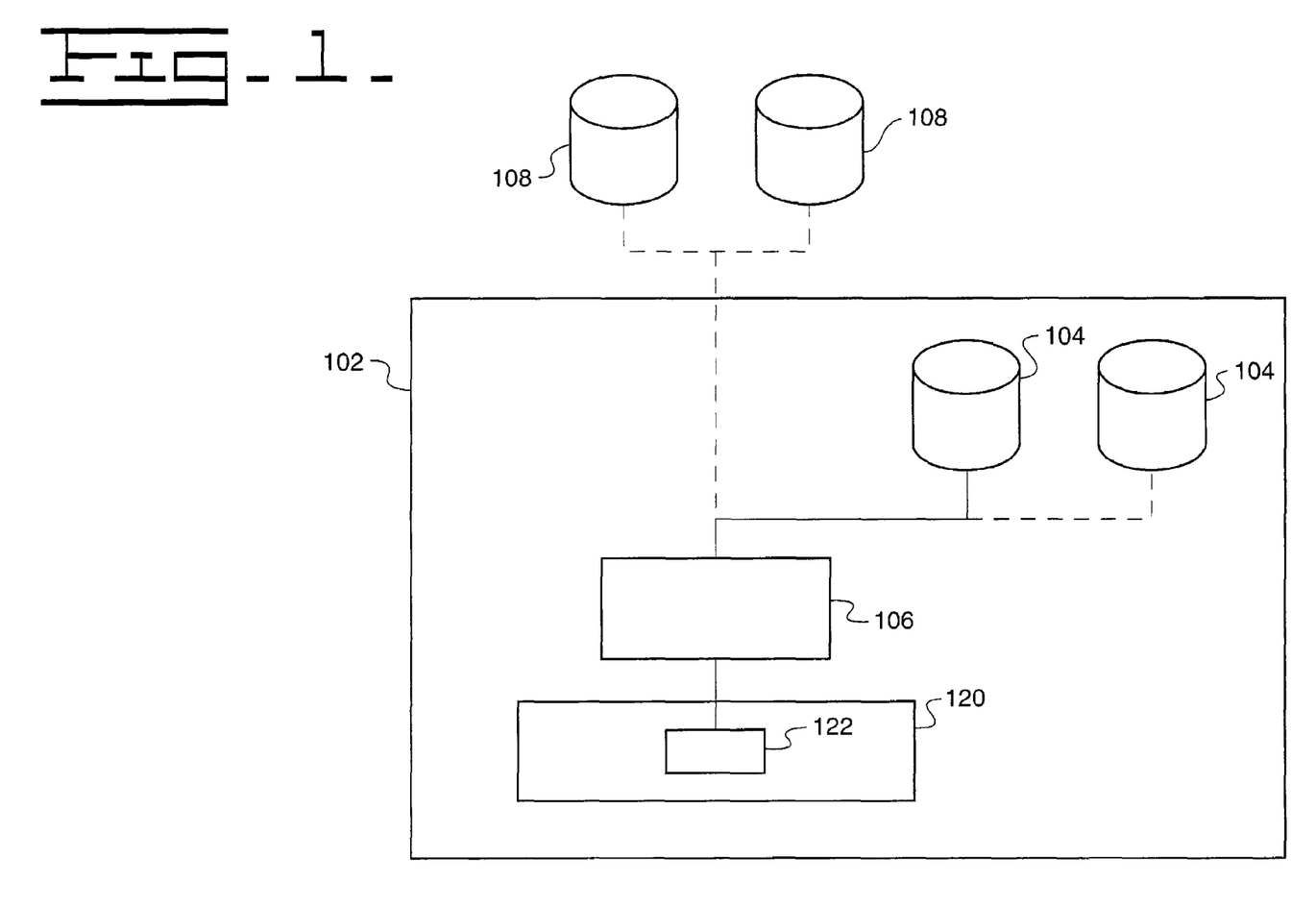
FIG. 1 is an illustration of one embodiment of a system associated with the present disclosure.

FIG. 1 illustrates one embodiment of a system 102 associated with the present disclosure. The system 102 may include a repository 104 of part characteristics. The system 102 also includes a processor 106 configured to establish a relationship between at least a portion of the parts (or part characteristics) and a pre-selected part characteristic (e.g., a cost characteristic), and then analyze the portion in response to the relationship. The processor 106 may include one or more algorithms configured to establish the relationship, or portions thereof. In one embodiment, the system 102 may include multiple part characteristic repositories 104a, 104b, 104c, etc. In addition, the system may be able to electronically communicate with other part characteristic repositories 108a, 108b, etc. The system 102 may also include a user interface 120. The user interface may include a display 122. Alternatively the display 122 may be considered a separate device.

Figure 2:
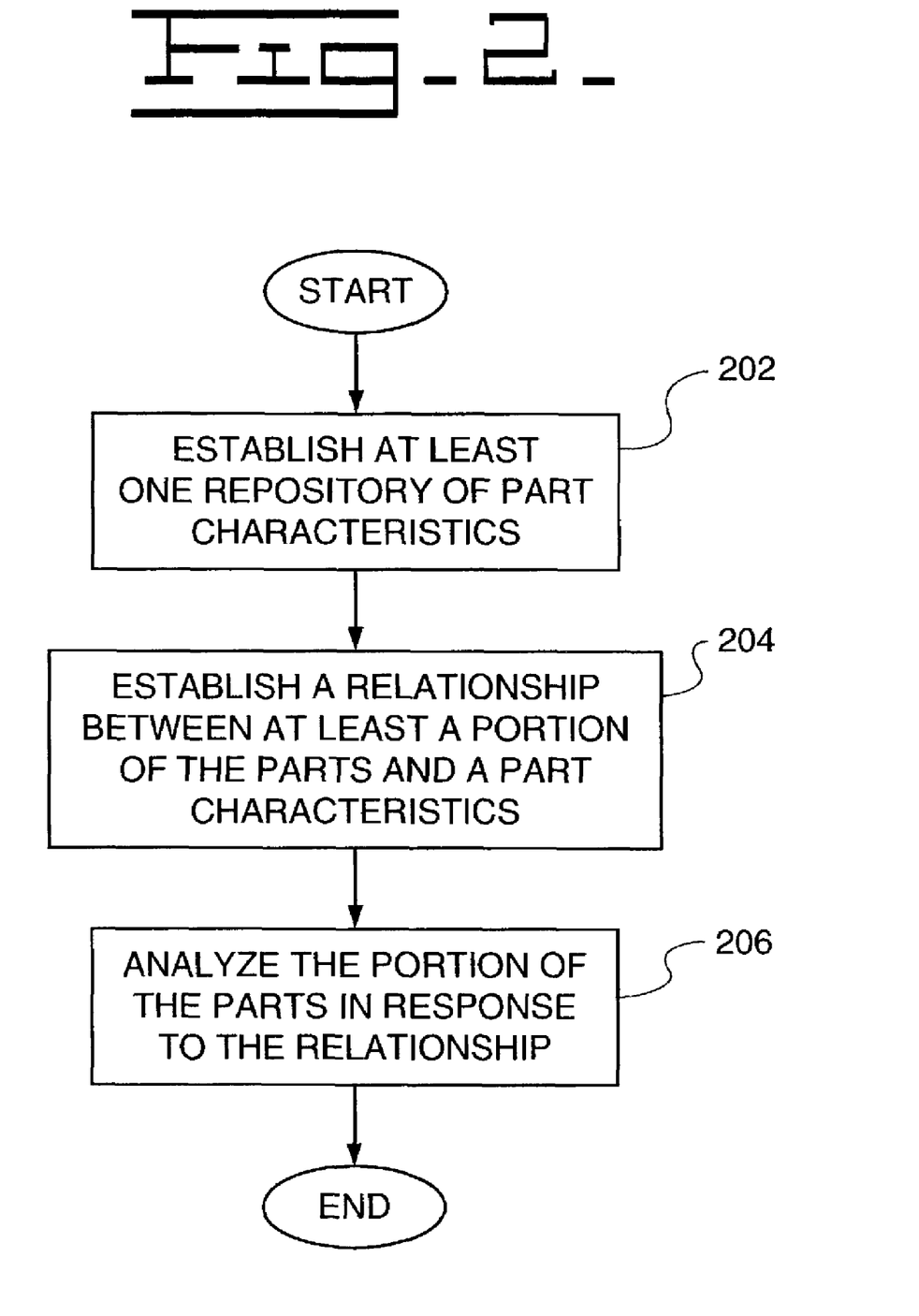
FIG. 2 is an illustration of one embodiment of a method of analyzing a plurality of parts.

FIG. 2 illustrates one embodiment of a method associated with the present disclosure. In a first control block 202, at least one repository of part characteristics is established. Establishing a repository of part characteristics may include identifying one or more existing repositories having part characteristics, creating a repository of part characteristics, or both. The part characteristic repository may have been established ahead of time, may be dynamically established, or a combination thereof. For example, the processor 106 may be preprogrammed with the name or location of one or more existing part characteristic repositories. The identified repositories may include the part characteristics, and/or addresses or electronic links to the location of the part characteristics or repositories that include the part characteristics. In this manner, when the method associated with the present disclosure is executed, the processor 106 knows what repository to access to acquire part characteristic information. Alternatively, the repository may be established (e.g., identified) in response to a user who may enter the name of a repository having the desired part characteristic information. In one embodiment, the processor 106 is programmed with the identity or location of a part characteristic repository, and this repository may be overridden, or supplemented by a user designated repository. In another embodiment, establishing a repository of part characteristics may include creating a repository of part characteristics. For example, in one embodiment, the repository may be established by creating a repository that includes electronic links to the appropriate repositories that include the information. Therefore, the established repository may include one or more links to other existing part characteristic repositories. The links may be activated when the part characteristic information is desired. Alternatively the established repository may be created by accessing the appropriate repositories having the part characteristic information, and electronically transferring the information into the repository being established, e.g., identified or created. Therefore the repository being established may include the part characteristics, or links to repositories having the part characteristics.

In one embodiment, the part repository 104 may be established by establishing the parts that are to be analyzed. The determination of which parts are to be reviewed may be made by a user and entered through a user interface 120 (e.g., a part or part characteristic request), programmed into the processor 106, and/or contained in a repository of parts which may be associated with the part repository 104, or a separate repository. A part characteristic request may include one or more of a part, part characteristic, particular value of a part characteristic (e.g., name of a particular supplier), etc. In one embodiment, the processor 106 may automatically determine which parts to review. For example, if a user enters a part type (e.g., bolt), the processor 106 may establish, or identify, all the parts that are bolts. Once the parts to be reviewed are identified, the repository 104 may be established. In one embodiment, the processor 106 may identify which repositories have the identified parts. In one embodiment, there is only one repository having all the part characteristics. Alternatively there may be multiple part characteristic repositories. In this embodiment, the processor may use a pre-existing table that correlates a particular part with one or more repositories having associated part characteristics. Alternatively, the processor 106 may access one or more repositories to determine which repositories have associated part characteristic information.

In one embodiment, a repository 104 may include all, or a portion, of the part characteristics associated with a part. In one embodiment, the desired part characteristics may be identified by a user and entered into the system via the user interface 120, or programmed into the processor 106 or contained in a repository 104, 108. Alternatively the processor may dynamically determine what part characteristics are associated with a part, or what part characteristic information is available. For example, the processor 106 may access one or more repositories to identify what part characteristics are available for a particular part. Different repositories may contain different part characteristics, and different parts may have different characteristics associated with them.

Examples of repositories which may be accessed include one or more repositories associated with: a repository of suppliers and the parts that they provide, the cost of the parts, and the volume sold of the parts, a logistics repository that may include the part number, cost, volume, and supplier of the parts, and/or an engineering repositories that may include the weight, surface finish, material etc., of the parts. The engineering repositories may include or be associated with repositories that have electronic drawings or images of the part. The part characteristics may be included in one or more of the repositories. For example, the weight of a part may be included in the logistics repository and the engineering repository. In one embodiment, one or more part characteristics may be manually entered by the user.

In one embodiment, the repository may be established based on a part characteristic to be analyzed. For example, the user may enter a part characteristic to be analyzed, irrespective of the type of part associated with the part characteristic. The processor 106 may then establish a repository of parts having the designated part characteristic. For example, the processor 106 may access one or more repositories to identify the parts having the desired part characteristics. The repository may be established based on information associated with one or more parts, or one or more part characteristics associated with the parts.

In one embodiment, establishing a repository of part characteristics includes formatting the part characteristic information appropriately, and verifying the information being established. For example, if multiple repositories contain a weight of a part, the system 102 may compare the two weights to see if they match. The weight listed in an engineering specification repository may be different from the weight listed in a logistics repository. The discrepancy may be caused by the logistics repository taking into account the shipping weight that may include a shipping container associated with the part. Therefore, there may be discrepancies in the information obtained by the system 102. Discrepancies may be resolved in several ways. For example, the user may have established a repository hierarchy or priority such that when a discrepancy occurs, part characteristics from one repository may be given deference, or priority, over the value of the same part characteristic received from a different repository. The repository hierarchy may be dynamically identified by a user, or pre-programmed into the process 106. In one embodiment, the user may specify what part characteristics should be retrieved from which repositories. Therefore, there are no discrepancies since the system takes the value identified for the part characteristic from the designated repository, and ignores other values available in other repositories. In another embodiment, the system may notify the user when a discrepancy is identified, and let the user resolve the discrepancy. Other forms of discrepancies may include finding no value associated with a particular part characteristic, or finding a value that is out or range. For example, a repository of part prices has a part listed, but may have no associated price. In addition, a part may be listed that has a price that is out of bounds, e.g., a bolt with a piece part price of $1,000,000. These discrepancies may be identified by bounds, or range checking. The user may be notified of these discrepancies.

In a second control block 204, a relationship between at least a portion of the parts, and a part characteristic is established. The part characteristic may be a pre-selected part characteristic such as a part characteristic that has be programmed into the system 102, or that is dynamically determined based on a user input, or a combination thereof. The parts selected to establish the relationship may include all parts, or parts associated with particular part characteristic, e.g., of similar part type, or from the same supplier etc. For example, the repository may include parts associated with part types such as connecting rods, flywheels, manifolds, pulleys etc. The parts that are connecting rods may be selected (i.e., the part type connecting rod may be selected). A relationship between the part characteristics of selected parts and a pre-selected part characteristic (e.g., cost) may be established. For example, analysis techniques may be used to establish the cost of a part as a function of one or more characteristics of the parts, such as the weight, material type, volume of a part, supplier, finish, etc. The information (or values) associated with the part characteristics may be used to establish the relationship between the parts and/or characteristics and the pre-selected characteristic.

The type of analysis used to establish the relationship is implementation dependant and may vary as a function of the data provided to the algorithm establishing the relationship, and/or the information being requested (e.g., part analysis request). The analysis may be dependent on the number of dependent variables and/or independent variables that are being analyzed in the relationship and/or the objective of the analysis being performed. For example, the analysis may include the use of classical, Bayesian, and/or machine learning techniques. Classical analysis techniques may include multivariate statistical techniques simple regression, multiple regression, factor analysis, item analysis multivariate analysis of variance, discriminant analysis, path analysis, cluster analysis, multidimensional scaling, and/or least squares estimation. In one embodiment, multiple regression may be used to determine the relationship between one dependent variable (e.g., a part characteristic such as cost) and multiple independent variables (i.e., multiple other part characteristics, such as weight, type of material, etc.). Other techniques, such as in factor analysis, cluster analysis, and multivariate techniques may be used when the desired relationship is associated with multiple dependent variables and multiple independent variables. Generic model-fitting or classification algorithms e.g., neural networks (e.g., back propagation, feed-forward networks etc.), meta-learning learning techniques such as boost etc., may be applied for predictive data mining. Predictive data mining techniques may be desired when the accuracy of a prediction is of higher priority, regardless of whether or not the models or techniques used to generate the prediction is interpretable or open to simple explanation. That is, data mining techniques may be desired when the objective is to predict the price of a future part, as opposed to analyze the existing relationship among the parts. As mentioned, the selection of the particular analysis technique(s) is implementation dependent and may be based on factors such as user preference, the data to analyze, and the number of dependent and/or independent variables, the objectives of the analysis. Therefore, as will be discussed below, the user may specify the analysis techniques to be used, or the system 100 may determine the appropriate technique(s) to use.

Additional analysis configuration may be performed on a selected or potential analysis technique. By way of example only, if multiple regression is the analysis technique used, an equation associated with the relationship may be: $Y=b1X1+b2X2+\ldots bnXn+c$, where the b's are the regression coefficients, representing the amount the dependent variable Y (e.g., the part characteristic cost) changes when the independent variable (the X's, e.g., the other part characteristics) change 1 unit. The c is the constant, where the regression line intercepts the y axis, representing the amount the dependent Y will be when all the independent variables are 0. In one embodiment, a determination may be made regarding whether any transformation (e.g., log functions, square roots, etc.) are needed to the proposed relationship (or equation). For example, should the log of a part characteristic be used in the relationship, should the square root of a part characteristic be used in the relationship etc. As will be discussed, the form of the equation, e.g., whether one or more transformations are used, may be determined by the user, by the system 102, or a combination thereof.

In one embodiment, different relationships may be created, e.g., using different transformations or different part characteristics for the multiple regression analysis, and analyzed to determine which relationships perform better than others. Goodness of Fit analysis techniques such as R2, RMS, P Value, F ratios, standard error etc., may be used to establish performance characteristics of the relationships. For example, techniques such as $R^2$, which establish the percent of variance in the dependent variable (e.g., the part characteristic cost), explained collectively by the independent variables (e.g. the other part characteristics). By using $R^2$, for example, an assessment may be made regarding which relationship best explains the variance in the dependent variable in response to the independent variables. RMS provides an indication of which model best predicts future aspects of a part, or part to be designed.

Therefore, in one embodiment, a threshold level of performance may be established for the relationship. If the relationship does not meet the threshold level of performance, then the user may be notified that the established relationship does not meet the desired level of accuracy, the desired level of ability to explain the variance in the dependent variable in response to the independent variables, or desired level of ability to predict future characteristics of the part. If multiple relationships are being compared with each other, and none of them exceed the desired level of success, then the user may be notified of which relationship performed best, but that none of them met the desired threshold. If multiple relationships are tested and one or more exceed the threshold, the best one may be selected, or they may all be provided to the user for selection.

In one embodiment, the system 102 may also establish which part characteristics are more relevant to the relationship than others. In this embodiment, part characteristics that are not significant to the relationship may be removed from the analysis, or analysis portion of the system 102. In one embodiment the relevance of the part characteristics may be established by analyzing the established relationship. For example, consider the simplistic equation:

Part Cost=10+8*(part weight (Kg))−4*(part demand).

In this example, an increase in weight by a Kg will increase the cost by 8, while an decrease in demand by 1 will increase the cost by 4. There is approximately a 2:1 ratio between weight and demand, indicating that weight has more of an influence on price than demand does. Therefore, a comparison of coefficients may be performed to establish the influence (or sensitivity), or relative influence of one part characteristic versus another. In one embodiment, the system 102 may utilize additional statistical analysis to establish the relevance of the independent variables and/or to select which variables to use in the relationship. Applicable techniques such as stepwise multiple regression (including forward selection, or backward elimination), forced entry, forced removal, and hierarchical multiple regression may be used. For example, multiple regression analysis may be used to establish a relationship between all of the independent variables (e.g., part characteristics), and the dependent variable (the part characteristic cost). The relationship establishes a relative influence of the independent variables. Then, forward selection (associated with stepwise regression) may be used to determine the relevance of the variables. Forward selection may begin with no independent variables in the equation (associated with multiple regression). The independent variable having the highest correlation, or influence, with the dependent variable may be added into the equation. The performance of the resulting equation may be determined using the assessment techniques previously discussed, such as $R^2$. The process may be repeated, adding another independent variable (and associated coefficient) to the equation, and then assessing the equation. Once all the independent variables have been added, the assessment metrics (e.g., $R^2$) may be compared to determine which equation best described the relationship. The variables in the equation that best describes the relationship may be considered to be the most relevant variables, and the other variables may be ignored. For example, a determination may be made regarding which variable (or characteristic) configuration resulted in the highest $R^2$, or noticeable improvements in $R^2$. Alternatively, each time an independent variable is added, the relationship is assessed to see if there was a noticeable improvement (e.g., was $R^2$ increased by an appreciable amount). If the assessment metric was not increased by a significant amount, then the process may be stopped, and the independent variables currently forming the relationship may be deemed to be the most relevant. The amount of increase in $R^2$ that triggers the completion of the process is implementation dependent.

The backward elimination process (associated with stepwise regression) begins with all the independent variables in the equation and sequentially removes them, analogous to the forward process, to determine the desired relationship. For example, after establishing the relative influence of the independent variables, the least influential independent variable may be removed from the equation. If the resulting $R^2$ is not significantly reduced, then the process may be repeated. In one embodiment, stepwise regression may be used when constructing the equation, or to prune the variables (or characteristics) used in establishing the equation.

In one embodiment, the system 102 is configured to automatically form a relationship between the selected part characteristics and the pre-selected characteristics (e.g., cost). The system may automatically develop multiple relationships, using a different analysis technique, and/or different transformations for the technique, and/or different independent variables in the relationships. The results may then be compared to determine which relationship most accurately describes the relationship. For example, techniques such as $R^2$ may be used to establish the accuracy of each relationship (or model). The resulting comparison may be used to select the most accurate relationship. In one embodiment, the system 102 may establish relationships based on all of the available techniques (e.g., a toolbox of Classical, Bayesian, and Machine learning techniques, and/or a combination thereof), and then compare the performance capabilities to establish the most appropriate relationship(s). Alternatively the system 102 may select analysis techniques based on analysis characteristics, such as the number of dependent variables to be analyzed, the number of independent variables to be analyzed, the objective of the analysis, the type of data involved, and/or the class of problem at issue. As will be described, in one embodiment, the user may enter one or more of the above analysis characteristics. In one embodiment, multiple relationships may be established to support different analysis objectives, e.g., to analyze a relationship among current parts or predict the characteristic of a future part. Therefore, the user may enter the analysis technique(s) to use, the system 102 may recommend analysis technique(s) to use based on user inputs, or the system 102 may automatically establish the techniques to be used so the user doesn't have to select a desired technique and/or associated technique configuration information.

In one embodiment, at least one economic characteristic may be included when establishing the relationship. Economic characteristics may include labor cost characteristics, inflation characteristics, a national economic index characteristics, and an industry economic index characteristic. In one embodiment, the economic and logistic characteristics may be used to normalize or offset external influences on the part characteristics. The economic and logistic characteristics may also be used to establish which parts are more susceptible to external influences or characteristics and to establish which external characteristics most influence the part characteristics. The part characteristics, logistic characteristics and economic characteristics may be associated with time periods. Therefore, the relationship may represent the relationship among the part characteristics, logistic characteristics, economic characteristics, and the pre-selected part characteristic, e.g., cost.

In one embodiment the system 102 may also establish confidence factors associated with the relationship, or results of the relation ship. The confidence factor may be based upon a single result (e.g., 70% sure that the result is $10/part, or upon a range of results (95% sure that the result is between $9 and $11/part).

In a third control block 206, at least a portion of the parts are analyzed in response to the relationship. The analysis is implementation dependent. The present disclosure provides for versatile analysis such that the user may configure the analysis for any aspect of the part or associated part characteristics. The analysis may include identifying anomalies in the relationship. For example, assume the part category analyzed is connecting rods, that there are twenty different types of connecting rods, and that there are four different suppliers of the connecting rods. The established relationship may be analyzed with respect to the different suppliers. For example, does any one supplier stand out as being more expensive than the others? Do suppliers have different specialties, e.g., have lower cost than the others when dealing with a particular material type? Does one supplier have better rates than others when volumes are low? How does a current supplier compare with a previous supplier, or a proposed future supplier? The established relationship may be analyzed with respect to one or more part characteristics, e.g., cost drivers. For example, what are the predominant cost drivers of the part, e.g., weight, material type, finish type, volume etc.? What would a future connecting rod cost based on this relationship. An engineer, for example, may have a theoretical or simulated design for a connecting rod. However, before prototypes of connecting rods are built, the established relationship may be used to determine what the projected cost of this connecting rod will be, e.g., based on projected weight, material type, volumes sold, supplier used, etc. In one embodiment, a confidence factor may be associated with the predicted values. For example, the confidence factor may be based on the squared standard error of mean predicted scores, the mean square residual, both of which may be obtained from typical regression outputs. In addition confidence factors associated with a value and/or a range of values may be established with machine learning techniques. If the predicted cost is too high, the engineers may consider different measures to reduce the cost in response to the cost drivers identified by the relationship, use a different design, use an existing part, use a different material, use a different supplier etc. In addition, if new material types are being considered, relationships associated with other parts of the material type may be analyzed to determine the cost effectiveness of the material type, and help make cost projections for the proposed part. Warranty and reliability predictions may also be made based on the part characteristics, and established relationship.

In one embodiment, if the economic characteristics and/or logistic characteristics are used in establishing the relationship, then analysis may be performed to determine the impact of economic and/or logistic factors on the relationship. For example, if a supplier provides multiple parts, but one of the parts seems overly expensive relative to the other parts and other suppliers, were there any economic characteristics that impacted the supplier that might not have impacted the others. For example, the parts were supplied during a particular interval in which labor cost were excessive, or there was a strike and an alternative work force was being used. In addition, there may be logistic factors impacting the cost (e.g., transportation or packaging cost). Therefore, these economic characteristics may have impacted this particular supplier during a discrete time period, and in such a way that other suppliers were not effected. This information may be used to avoid over-reacting to a problem that was temporary, and to interact with the impacted supplier to determine why the cost were higher and what can be done in the future to reduce the cost.

INDUSTRIAL APPLICABILITY

The present invention includes a method and system configured to analyze a plurality of parts. Each of the parts has at least one part characteristic. The method includes the steps of establishing at least one repository of part characteristics, establishing a relationship between at least a portion of the parts and a part characteristic, and analyzing the portion of the parts in response to the relationship.

Figure 3:
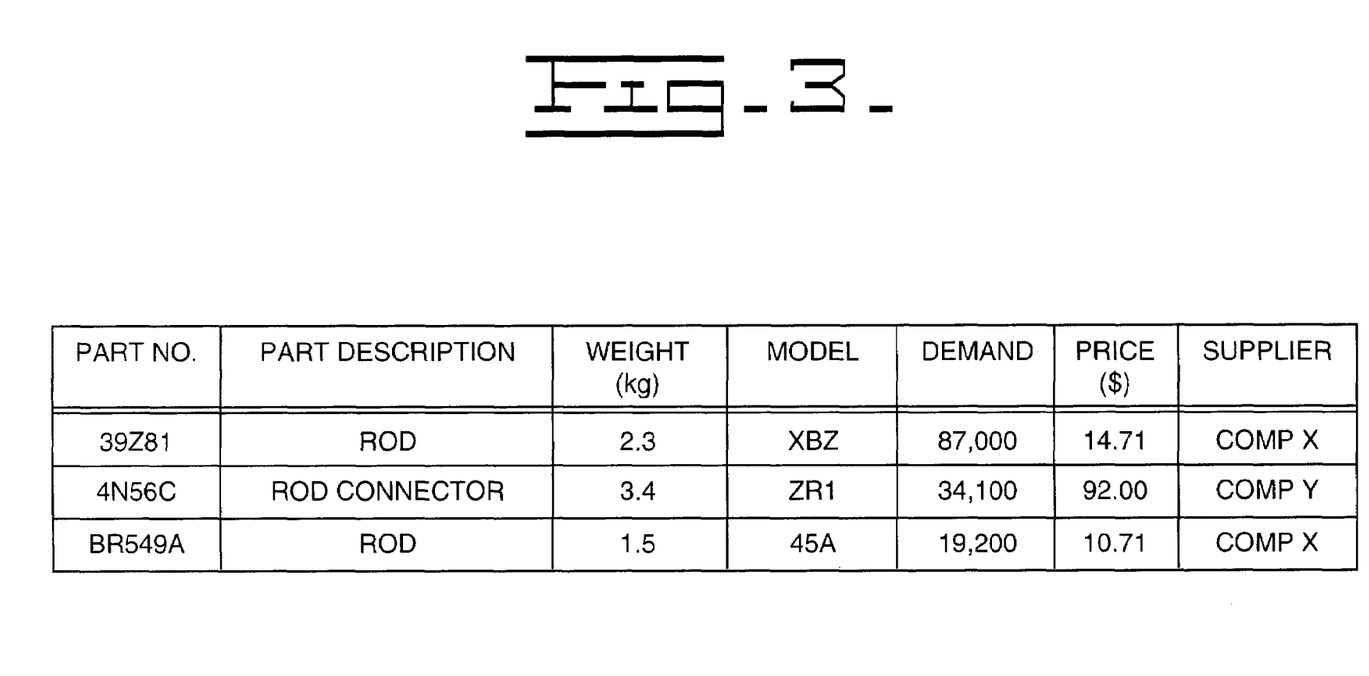
FIG. 3 is an illustration of one embodiment of a table of parts associated with a repository.

In one embodiment, a repository of the characteristics associated with parts may be established. The type or number of parts to be included in the repository is implementation dependent. In one embodiment, the repository may include part characteristics for all of the parts associated with a company, e.g., the company who owns the parts. Alternatively, the part characteristics may be associated with a portion of the company, such as a particular department or group. The repository may exist, or may be dynamically created, or a combination thereof. The part characteristics may be for a particular part type or supplier. FIG. 3 illustrates one embodiment of a table of parts associated with the repository. The table may illustrate the part numbers (rows) as a function of the part characteristics (columns). The data associated with the table may be physically stored in the repository 104. Alternatively, some or all of the data may be established by dynamically accessing other repositories. For example, based on links stored in the repository that enable an electronic connection to be made to another repository to access the information. For example, information associated with engineering specifications may be stored in a separate repository, and accessed when needed.

In one embodiment, the user may interact with a user interface 120 to select the parts (or part characteristics) the user would like to analyze (e.g., part characteristic request). The user interface 120 may enable the user to select (e.g., via a pull down menu or data entry prompt) among part types to analyze, e.g., flywheel, pulley, sleeve, connecting rod, flange, and/or adaptor, other, or All Parts. "Other" may be used to enter a request for information associated with a part, or part characteristic the system 102 hasn't dealt with, e.g., characteristics associated with a new part in a repository that haven't been accessed by the system 102. In addition the user interface may enable the user to select among suppliers to analyze, e.g., supplier A, supplier B, and/or supplier C, or All Suppliers. That is, the parts provided by one or more specific suppliers may be analyzed. The user interface (e.g. through pull down menus, data entry capability etc.) may enable the user to select among part characteristics to analyze, e.g., part type, material type, finish type, weight, volume etc. For example, the user may select a part and be presented with the available part characteristics associated with the part, with which to configure the analysis. In one embodiment, a user may enter a part characteristic, and be presented with all the available parts (or part types) having that part characteristic. In one embodiment, the user may select a time period associated with the analysis, e.g., all part data from the last 5 years, or all part data associated with a particular part characteristic from the last 5 years, etc. In one embodiment, time based data may be normalized (e.g., to account for inflation etc.), such that the underlying causes of cost may be further analyzed. In this manner, the user may configure the parts analysis relative to their specific desires. The selection of the parts to be analyzed may be as broad or narrow as the user desires, and the associated analysis may be as broad or narrow as they desire.

Figure 4:
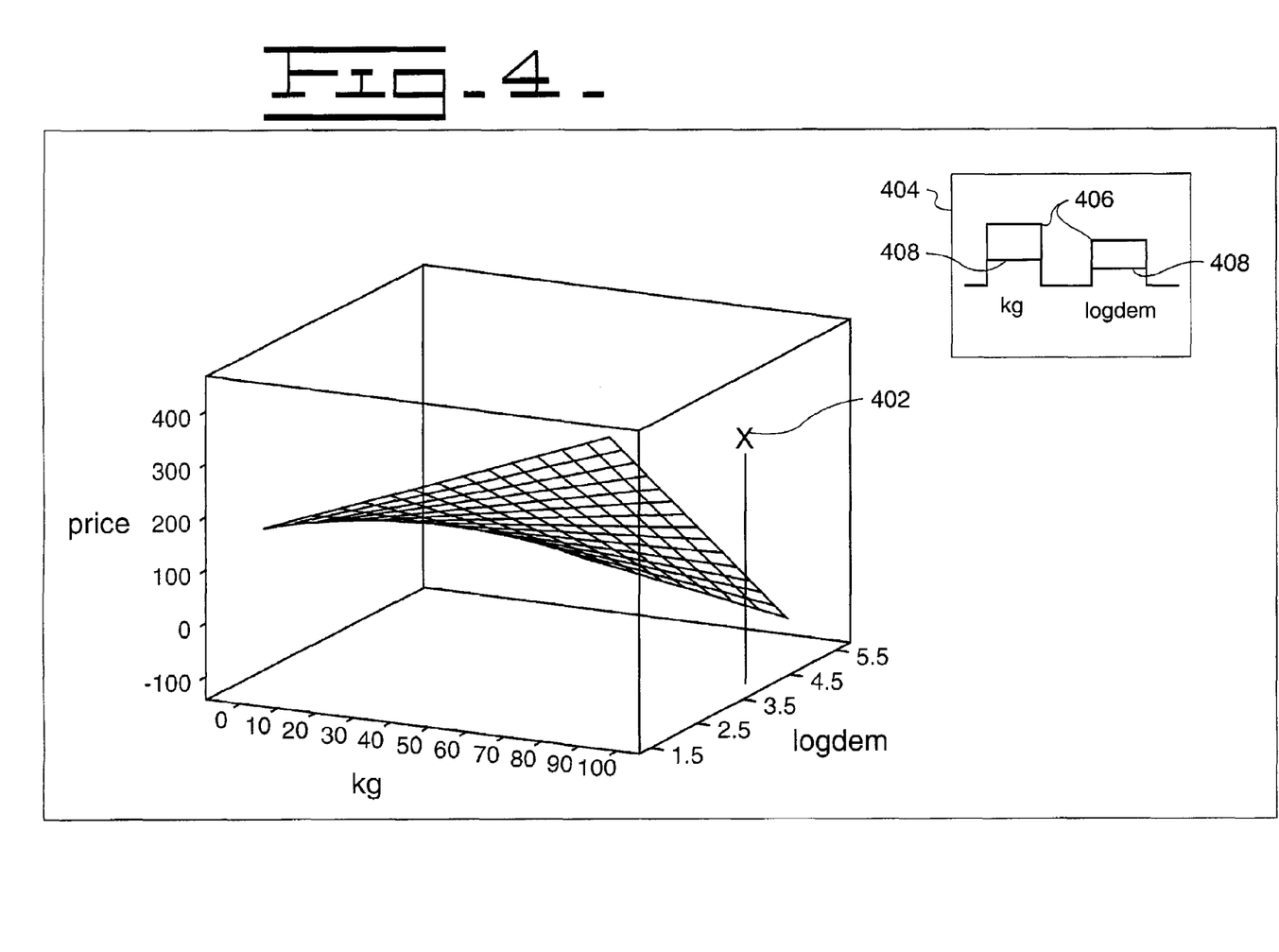
FIG. 4 is an illustration of an exemplary relationship associated with all connecting rods in a repository with respect to the part characteristics weight, demand (or volume), and price (or cost)

Once the parts to be analyzed have been established, the system 102 develops a relationship between the characteristics of the selected parts and a part characteristic of the parts (e.g., cost). In one embodiment, the user may select the analysis technique to use, the technique configuration to use, and/or the performance technique/criteria to use. In an alternative embodiment, the user may enter some analysis characteristics e.g., objectives of the analysis, or number of dependent variables and the number of independent variables etc. The system 102 may recommend certain analysis techniques, technique configurations, and/or performance techniques/criteria to the user based on the analysis characteristics established by the user. The user may then select the desired techniques etc., to establish the relationship(s). In one embodiment, the system may automatically identify an appropriate analysis technique(s) and/or configuration, and/or performance criteria, with or without user established analysis characteristics. For example, the system 102 may provide a list of analysis techniques from which to select. One of the selections may be Automatic, or Best Fit, meaning the user would like the system 102 to determine and apply the most appropriate analysis technique. In the later case, the system will develop a relationship among the part characteristics and pre-selected part characteristic (e.g., cost) using applicable analysis techniques. The system 102 may then apply an assessment criteria (or accuracy technique), e.g., $R^2$, to determine which relationship was the most accurate or most appropriate. As mentioned, some of the analysis characteristics the system 102 may account for in determining the appropriate relationships are: how many dependent variables and independent variables are being analyzed, what is the objective of the analysis, e.g., is the relationship to be used for future part cost projections, current relationship analysis, or both. The user may be prompted for these characteristics through the user interface and/or display. For example, the user may be prompted to enter the dependent variable(s) (e.g., cost characteristic). The user may select from a menu having all part characteristics, or may be prompted to enter the data. In addition, the user may be prompted for the independent variables. The may be provided a list of all available part characteristics, and the option "All". The option "All" would then select all of the part characteristics (except the dependent variables) for the independent variables. The system 102 may use these analysis characteristics to select an analysis technique. If the established relationship does not meet an established threshold, the system 102 may identify another technique to develop the relationship. Alternatively, the system 102 may develop multiple relationships using all applicable techniques and then compare the established relationships to determine which, if any, are most appropriate. For example, if the user selects cost as the dependent variable, and "All", as the independent variable, and selects as the objective: Existing Parts Analysis (as opposed to Characteristic Predictions) then the system 102 may select multiple regression as the analysis technique (e.g., select classical techniques based on the analysis characteristics, and then further select techniques such as multiple regression based on the number of dependent variables and the number of independent variables). If several techniques may be applicable to the analysis characteristics, then the system 102 may test the techniques, or further develop the configurations of the techniques before testing. In one embodiment, the system 102 may select multiple regression, and then develop multiple relationships to determine what, if any, transformations are needed, and what the relevant part characteristics are. FIG. 4 illustrates an exemplary relationship associated with all connecting rods in the repository with respect to the part characteristics weight, demand (or volume), and price (or cost). The relationship was established using multiple regression analysis Upon completion of the relationship, the parts may be analyzed in response to the established relationship. In one embodiment, the system may provide the user with several techniques to view the established relationship and associated analysis. The display techniques, or formats, may include representing the relationship and/or analysis as a surface plot, histogram, box plot or other technique for graphically representing information. The user may provide a display request indicative of the desired manner to view the relationship or associated analysis. For example, FIG. 4 illustrates the relationship of cost versus weight and demand of connecting rods, in the form of a surface plot. With reference to FIG. 4, if the user would like to predict the price of a connecting rod being currently designed, they may enter a predicted weight of the connecting rod, and predicted sales volume of the connecting rod, and the system will determine the predicted price of the connecting rod based on the established relationship. The system 102 may provide a confidence factor associated with the prediction. While the analysis technique associated with FIG. 4 was multiple regression analysis, other relationships using different types of analysis such as machine learning may have been established. For example, multiple relationships may be developed such that if the user desires to determine future characteristics, they may use the appropriate model, or if they desire to analysis current part characteristics they have the appropriate model available. That is the relationships have been established for seamless user analysis. Alternatively, if the user attempts to analyze the data in a manner in which the relationship is not the most appropriate, the system 102 may run additional analysis to establish the most appropriate relationship for the user's requested analysis.

In one embodiment, the user may highlight a particular point in the relationship, e.g., an outlier 402, and obtain information about the point, as illustrated in FIG. 4. An outlier is a data point that lies outside the general map defined by the established relationship. When the point is highlighted, an additional information box 404 may appear. The information box 404 may indicate the characteristics of the part associated with the point, e.g., part number, supplier, weight, demand, price, use, etc. The information box 404 may indicate the actual part characteristic information 406 of the point 402, and also the expected part characteristic information 408 of the point 402, based on the relationship. That is, expected part information may be based on the projected part information based on the relationship established (e.g., the surface map). This may be done graphically, or textually. In this manner the information box 404 is providing target (or expected values) to obtain. In one embodiment, the expected and actual values may be displayed in order of how far from the expected values the actual values were. Alternatively, the values will be displayed in order of importance. For example if the actual weight is off by 2 Kg, and volume off by 3 units, and the relative influence is 2:1 (an increase in one Kg has twice the impact on cost that a decrease in 1 unit sold has), then weight may be shown first because it contributed the most to the difference between actual and expected price. In one embodiment the information displayed in the information box may be normalized, e.g., relative to how much difference there is between the actual and the expected values. In one embodiment, the point to be analyzed, e.g., an outlier, may be activated, e.g., clicked on, in which case an information screen is displayed. The information screen may provide the same information as the information box 404 described above. The information screen may provide additional information about the outlier 402, and provide recommendations on what actions to take in order to enable the outlier to conform to the established relationship. For example, in one embodiment, the system may compare analogous part characteristics to establish the difference between the outlier and analogous data points. For example, surrounding points may not be surface finished, which reduces their cost. Therefore, the recommendation may be to avoid surface finishing if possible. The system 102 may establish that the outlier is a part manufactured by Supplier A. The system 102 may compare all of the connecting rods (for example) made by Supplier A and establish that generally, Supplier A's parts are defined by the established relationship, and that predominately Supplier's A's parts are high volume parts. However, the outlier is a low volume part. Therefore, the system may notify the user, e.g., through the information box 404, or information display, that the price of this specific part is an outlier 402 in the general relationship of the connecting rods, that the part is an outlier relative to the other parts supplied by Supplier A, and that the other parts supplied by Supplier A are high volume parts. Therefore, Supplier A may have difficulty cost effectively supplying low volume parts. Therefore, if Supplier A is unwilling, or unable to reduce their price, then a supplier that is more cost effective for low volume parts may be identified and engaged. In one embodiment, the user is presented options on how to view or analyze the data. For example, the user may select connecting rods for analysis. The user may identify an outlier, e.g., as illustrated in FIG. 4. The user may then enter the name of the supplier in a data entry portion, or the user may activate the supplier name in the information box 404 (e.g., click on "Supplier A" displayed in the text box. The system 102, may then establish the relationship (or establish the displays based on the existing relationships) such that the parts associated with "Supplier A" may be displayed. The relationship associated with parts supplied by "Supplier A" may then be analyzed further. In this manner, the user is able to seamlessly move through the desired parts analysis. In another example, if the other parts in the general area of the expected value of the outlier are brackets made of aluminum, and the outlier is made of steel, the system may recommend using one of the other brackets, or changing the material of the outlier to aluminum. In one embodiment, the information display may also provide a link to an electronic drawing of the part, and any system identified comparable parts. In this manner, the user may activate the link and view the electronic drawings of the part. This may enable the user to quickly view the outlier to assess if there is anything visually unique about the part, and also to make an initial comparison of the outlier part with analogous parts to determine if another part may be used instead. While outliers have been used to discuss the functionality of the system 102, any of the data points viewed, or relationship maps/plots may be highlighted or selected in order to obtain additional information/analysis. In one embodiment, the system may compare the part characteristics of the outlier with other parts in the general area of the expected value, and identify any differences. That is, the system may recommend a more cost effective part, that already exists.

Figure 5:
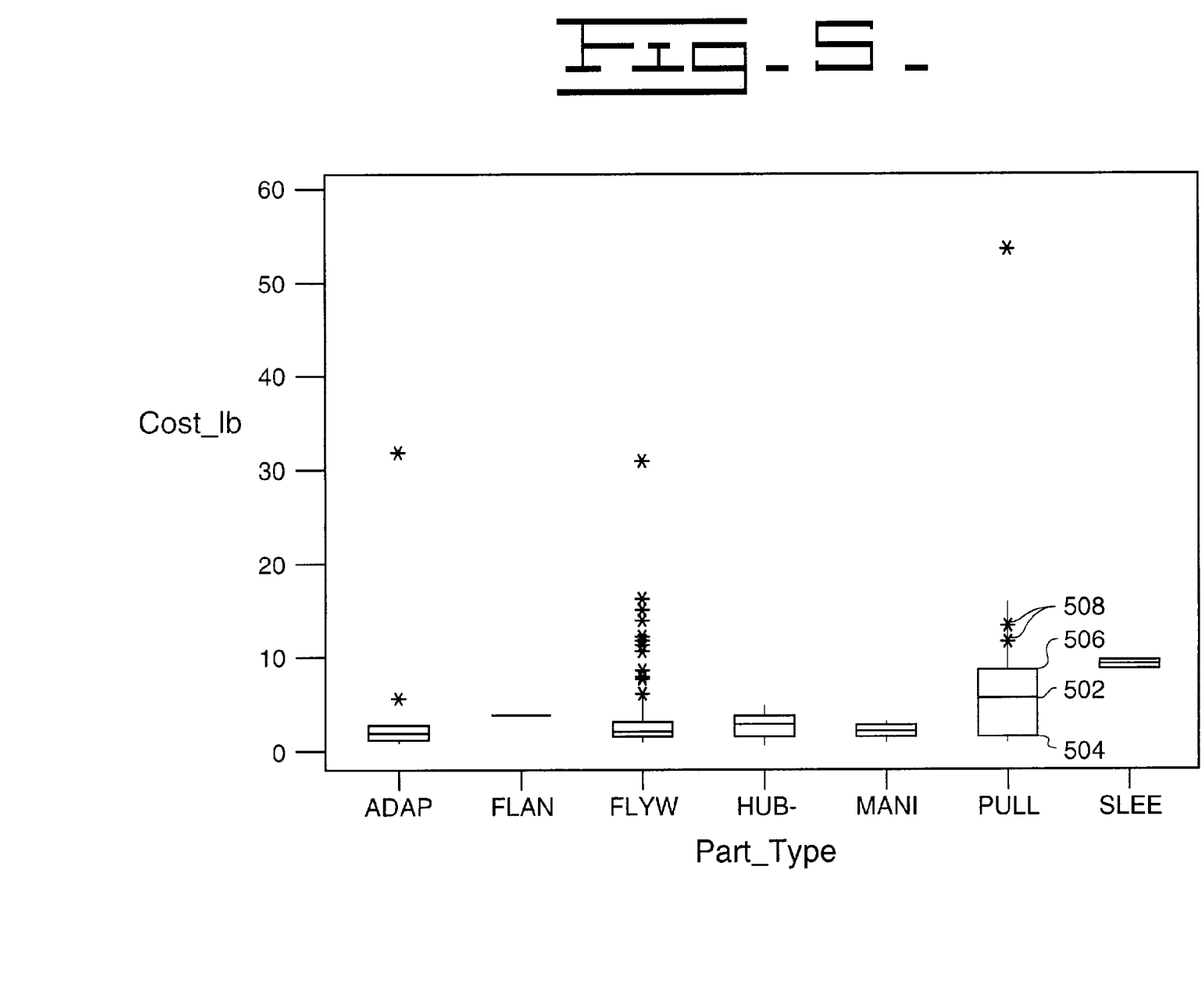
FIG. 5 is an illustration of box plots associated with the different parts an exemplary supplier makes.

In one embodiment, the user may establish a relationship associated with a particular supplier, all of the parts they provide, and associated cost. Then the relationship may be analyzed, for example, to determine the average cost of the different part types, as illustrated in FIG. 5. FIG. 5 illustrates box plots associated with the different parts a particular supplier makes. The box plot illustrates a distribution of the part cost for the associated parts. For example, the box plot illustrates the average part cost 502 (or alternatively the mean), the 20% distribution 504, the 70% distribution 506, and associated outliers 508. The resulting analysis may indicate which parts the supplier is cost effective on, and which ones they are not, and which parts the supplier is cost effective on relative to their own capability. The analysis may be used as a focal point for discussions with the supplier to determine why they are more expensive in providing pulley's than their other parts. In addition, analysis may be performed to determine why some distribution ranges are larger than others. For example, why the distribution range on pulleys is more than flywheels. In one embodiment, one of the data points, e.g., an outlier 506, may be highlighted, and the characteristics of the part may be illustrated, e.g., with an information box, or information display. In addition, the data point (or part) may be highlighted, and the user may be provided the option of displaying the established relationship map between cost and the other part characteristics, an example of which is illustrated in FIG. 4. If the relationship map (or surface) does not already exist, the system may build it when requested. In this manner the information may be manipulated from one representation to another based upon the established relationship, thereby providing user requested information that describe and explain the relationships among the parts. In one embodiment, box plots of multiple suppliers may be displayed next to each other, i.e., corresponding parts located next to each other, such that the user may understand how suppliers compare in general on different part types. In one embodiment, the user may highlight a particular part, e.g., an outlier on a surface plot, and then select (e.g., through a pull down menu, or pop up menu activated by highlighting the part and activating a mouse) the desired manner of viewing the associated relationship/displays, such as a box plot associated with the supplier of the part, a box plot associated with all suppliers, a plot of parts having the same material, a normalization of the part or one or more characteristics of the part. In another example, a normalized relationship, discussed below, may illustrate that an outlier part, which was heat treated, is actually in line with other heat treated parts from the same supplier, or other suppliers. Therefore, the reason this selected part was an outlier may be established to be due to the fact that it was heat treated and the other parts from the same supplier, e.g., other pulley parts were not.

In one embodiment the relationship associated with the part characteristics may be normalized. For example, the connecting rods located on the surface of the map illustrated in FIG. 4 may be made of aluminum, and the outlier 402 made of steel. There may be a 2:1 cost difference between steel and aluminum. Therefore, if normalized the data point of the steel part may move down to the surface, or close to it. By normalizing one or more characteristics, the readily explainable factors associated with why a part is an outlier may be accounted for, leaving the outliers to mainly represent unexplained deviations. Therefore, in one embodiment, the user may select an option to normalize the part characteristics associated with a surface. Alternatively they may normalize the part characteristics associated with a particular part. In another embodiment, the user may normalize a particular characteristic of a part to determine the impact (or reduce the impact) of that one particular characteristic, thereby visually identifying other features that may be causing the data point to be an outlier. For example, the material cost (or material type) may be normalized to determine the impact on the relationship. In one embodiment, the user may enter the normalization factors (e.g., steel is twice the cost of aluminum). Alternatively, the normalization factors may be stored in the system 102, or dynamically determined based on factors such as current labor rates, transportation rates, material cost etc.

In one embodiment, there may be multiple surfaces plotted based on the part characteristics. For example, there may be a surface associated with heat treated connecting rods, and a surface associated with non heat treated rods. In this scenario, the two maps may be normalized, or adjusted to account for the impact of the particular characteristic (e.g., expense of the heat treatment process). When multiple surfaces are mapped in the same graph, the intersection of the two surfaces, if there is one, provides insight into the crossover point from where it is more cost effective to use aluminum (for example) to where it is more cost effective to use steel. This data helps establish when to use one part characteristic over another (e.g., material, material finish etc.)

Other aspects, objects, and advantages of the present invention can be obtained from a study of the drawings, the disclosure, and the claims.

What is claimed is:

1. A computer method for analyzing a plurality of parts, each of the parts having at least one part characteristic, comprising:
   establishing at least one computer database repository of said part characteristics using a computer processor;
   establishing a relationship between at least a portion of said parts and at least one of said part characteristics using said computer processor;
   analyzing said portion of said parts in response to said relationships using said computer processor;
   establishing a part category using said computer processor;
   associating at least a portion of said parts with said part category based upon at least one of said characteristics of said part using said computer processor;
   establishing said relationship between said associated parts and a cost characteristic using said computer processor;
   establishing a plurality of relationships between at least a portion of said parts and said cost characteristic using said computer processor;
   establishing an accuracy characteristic for each of said plurality of relationships using said computer processor; and
   establishing said relationship in response to said accuracy characteristics using said computer processor.

2. A method, as set forth in claim 1, further comprising the step of establishing at least one of said part characteristics of said portion of said associated parts, as a cost driver, in response to said established relationship.

3. A method, as set forth in claim 2, wherein the step of analyzing said portion of said parts comprises:
   establishing a future part, said future part having at least one of said part characteristics; and
   establishing a cost characteristic associated with said future part in response to said relationships and at least one of said characteristics of said future part.

4. A method, as set forth in claim 3, wherein the step of establishing said future part cost characteristics comprises the steps of:
   establishing at least one cost driver associated with said future part in response to said relationship; and
   establishing said future part cost characteristic in response to said relationship, and said at least one future part cost driver.

5. A method as set forth in claim 2, wherein said cost driver is at least one of a supplier, a material type, a weight, a finish type, and a volume.

6. A computer method for analyzing a plurality of parts, each of the parts having at least one part characteristic, comprising:
   establishing at least one computer database repository of said part characteristics using a computer processor;
   establishing a relationship between at least a portion of said parts and at least one of said part characteristics using said computer processor;
   analyzing said portion of said parts in response to said relationship using said computer processor;
   automatically establishing an analysis technique using said computer processor;
   and establishing said relationship in response to said analysis technique using said computer processor;
   establishing a part category using said computer processor;
   associating at least a portion of said parts with said part category based upon at least one of said characteristics of said part using said computer processor;
   establishing said relationship between said associated parts and a cost characteristic using said computer processor;
   establishing a plurality of relationships between at least a portion of said parts and said cost characteristic using said computer processor;
   establishing an accuracy characteristic for each of said plurality of relationships using said computer processor; and
   establishing said relationship in response to said accuracy characteristics using said computer processor.

7. A method, as set forth in 6, wherein the step of automatically establishing said analysis technique further includes the step of automatically establishing said analysis in response to said part characteristics associated with said portion of said parts.

8. A method, as set forth in claim 6, wherein the step of automatically establishing said analysis technique further includes the step of automatically establishing said analysis technique in response to a parts analysis objective.

9. A method, as set forth in claim 8, wherein said parts analysis objective is one of a characteristic prediction and a relationship explanation.

10. A method, as set forth in claim 6, wherein said relationship includes a number of dependent variables, and further wherein the step of automatically establishing an analysis technique further comprises the step of:
    automatically establishing said analysis technique to establish said relationship in response to said number of dependent variables.

11. A method, as set forth in claim 6, wherein said analysis technique is one of a classical technique, a Bayesian technique, and a machine learning technique.

12. A method, as set forth in claim 11, wherein the step of automatically establishing said analysis technique further includes the step of automatically establishing said analysis technique in response to a parts analysis objective.

13. A method, as set forth in claim 12, wherein said parts analysis objective is one of a characteristic prediction and a relationship explanation.

14. A method, as set forth in claim 13, wherein said classical technique is established in response to said objective being said relationship explanation.

15. A method, as set forth in claim 14 wherein said machine learning technique is established in response to said objective being said characteristic prediction.

16. A method, as set forth in claim 15, wherein said portion of said parts include a plurality of relevant characteristics, further comprising the step of automatically establishing said relevant characteristics.

17. A computer system analyzing a plurality of parts, each of the parts having at least one part characteristics, said system comprising:
    a computer database;
    a computer processor, said computer processor
       establishing at least one computer database repository of said part characteristics;
       establishing a relationship between at least a portion of said parts and at least one of said part characteristics;
       analyzing said portion of said parts in response to said relationships;
       establishing a part category;
       associating at least a portion of said parts with said part category based upon at least one of said characteristics of said part;
       establishing said relationship between said associated parts and a cost characteristic;
       establishing a plurality of relationships between at least a portion of said parts and said cost characteristic;
       establishing an accuracy characteristic for each of said plurality of relationships; and
       establishing said relationship in response to said accuracy characteristics; and
    a computer user interface, said computer user interface enabling a user to graphically interact with said system.

18. A system, as set forth in claim 17, wherein said user interface is further configured to receive a parts analysis request from a user, and said processor is further configured to retrieve one or more of said part characteristics from an external computer database repository.

19. A system, as set forth in claim 17, wherein said parts analysis request includes a part characteristics, and wherein said processor is further configured to retrieve one or more parts from an external computer database repository in response to said part characteristic.

20. A system, as set forth in claim 19, wherein said system repository includes an electronic connection to one or more external repositories.

21. A system, as set forth in claim 17, wherein said processor is further configured to automatically establish an analysis technique, said relationship being established in response to said analysis technique.

22. A system, as set forth in claim 21, wherein said user interface is further configured to receive a analysis objective from said user, and wherein said processor is further configured to automatically establish said analysis technique in response to said analysis objective.

23. A system, as set forth in claim 21, wherein said relationship includes a number of dependent variables, and further wherein said user interface is further configured to receive said number from said user, and wherein said processor is further configured to automatically establish said analysis technique in response to said number of dependent variables.

24. A system, as set forth in claim 17, wherein said user interface includes a display, and wherein said user interface is configured to receive a parts analysis request from said user, and wherein said processor is further configured to analyze said relationship in response to said parts analysis request.

25. A system, as set forth in claim 24, wherein said user interface is further configured to receive a display request, to display said relationship analysis in response to said display request.

26. A computer system analyzing a plurality of parts, each of the parts having at least one part characteristic, comprising:
- a computer processor establishing at least one computer database repository of said part characteristics;
- said computer processor establishing a relationship between at least a portion of said part and at least one of said part characteristics;
- said computer processor analyzing said portion of said parts in response to said relationship;
- said computer processor establishing a part category;
- said computer processor associating at least a portion of said parts with said part category based upon at least one of said characteristics of said part;
- said computer processor establishing said relationship between said associated parts and a cost characteristic;
- said computer processor establishing a future part, said future part having said at least one part characteristic;
- said computer processor establishing said cost characteristic associated with said future part in response to said relationship and at least one of said characteristics of said future part;
- said computer processor establishing a plurality of relationships between at least a portion of said parts and said cost characteristic;
- said computer processor establishing an accuracy characteristic for each of said plurality of relationships; and
- said computer processor establishing said relationship in response to said accuracy characteristics.

27. A computer system for analyzing a plurality of parts, each of the parts having at least one part characteristic, comprising:
- a computer processor establishing at least one repository of said part characteristics;
- said computer processor establishing a relationship between at least a portion of said parts and at least one of said part characteristics;
- said computer processor analyzing said portion of said parts in response to said relationship;
- said computer processor establishing a part category;
- said computer processor associating at least a portion of said parts with said part category based upon at least one of said characteristics of said part;
- said computer processor establishing said relationship between said associated parts and a cost characteristic;
- said computer processor establishing a future part, said future part having said at least one part characteristic;
- said computer processor establishing said cost characteristic associated with said future part in response to said relationship and at least one of said characteristics of said future part; and
- said computer processor establishing at least one of said part characteristics of said portion of parts, as a cost driver, in response to said established relationship.

28. A method as set forth in claim 27, wherein said cost driver is at least one of a supplier, a material type, a weight, a finish type, and a volume.

29. A computer method for analyzing a plurality of parts, each of the parts having at least one part characteristic, comprising:
- establishing at least one computer database repository of said part characteristics using a computer processor;
- establishing a relationship between at least a portion of said parts and at least one of said part characteristics using said computer processor;
- analyzing said portion of said parts in response to said relationship using said computer processor;
- establishing a part category using said computer processor;
- associating at least a portion of said parts with said part category based upon at least one of said characteristics of said part using said computer processor;
- establishing said relationship between said associated parts and a cost characteristic using said computer processor;
- a future part, said future part having said at least one part characteristic using said computer processor;
- establishing said cost characteristic associated with said future part in response to said relationship and at least one of said characteristics of said future part using said computer processor;
- establishing at least one cost driver associated with said future part in response to said relationship using said computer processor; and
- establishing said future part cost characteristic in response to said relationship, and said at least one future part cost driver using said computer processor.

30. A computer based method for analyzing a plurality of parts, each of the parts having at least one part characteristic, comprising:
- establishing at least one computer database repository of said part characteristics using a computer processor;
- establishing a relationship between at least a portion of said parts and at least one of said part characteristics using said computer processor;
- analyzing said portion of said parts in response to said relationship using said computer processor;
- establishing a part category using said computer processor;
- associating at least a portion of said parts with said part category based upon at least one of said characteristics of said part using said computer processor;
- establishing said relationship between said associated parts and a cost characteristic using said computer processor;
- establishing at least one of said part characteristics of said portion of parts as a cost driver, in response to said established relationship using said computer processor;
- automatically establishing a plurality of relationships using a plurality of analysis techniques; using said computer processor
- establishing an accuracy of said relationships using said computer processor;
- establishing said relationship in response to said relationship accuracy using said computer processor; and
- comparing a plurality of suppliers in response to said relationship using said computer processor.

31. A method, as set forth in claim 30, wherein the step of establishing said relationship accuracy further comprises the step of automatically establishing an accuracy technique to establish said relationship accuracy.

32. A method, as set forth in claim 31, wherein the step of automatically establishing said accuracy technique further includes the step of automatically establishing said accuracy technique in response to a parts analysis objective.

* * * * *